US009932989B1

(12) United States Patent
Heath et al.

(10) Patent No.: US 9,932,989 B1
(45) Date of Patent: Apr. 3, 2018

(54) PRODUCED LIQUIDS COMPRESSOR COOLER

(71) Applicants: Rodney T. Heath, Farmington, NM (US); Forrest D. Heath, Katy, TX (US); Gary Heath, Farmington, NM (US)

(72) Inventors: Rodney T. Heath, Farmington, NM (US); Forrest D. Heath, Katy, TX (US); Gary Heath, Farmington, NM (US)

( * ) Notice: Subject to any disclaimer, the term of this patent is extended or adjusted under 35 U.S.C. 154(b) by 784 days.

(21) Appl. No.: 14/523,562

(22) Filed: Oct. 24, 2014

Related U.S. Application Data

(60) Provisional application No. 61/895,356, filed on Oct. 24, 2013.

(51) Int. Cl.
| | | |
|---|---|---|
| B01D 53/00 | (2006.01) |
| F04D 29/58 | (2006.01) |
| F28D 1/047 | (2006.01) |
| B01D 53/14 | (2006.01) |

(52) U.S. Cl.
CPC ......... *F04D 29/5833* (2013.01); *B01D 53/00* (2013.01); *B01D 53/14* (2013.01); *F28D 1/047* (2013.01)

(58) Field of Classification Search
CPC ................................. B01D 53/00; B01D 53/14
USPC .......................................... 95/39, 42; 165/96
See application file for complete search history.

(56) References Cited

U.S. PATENT DOCUMENTS

| | | | |
|---|---|---|---|
| 844,694 A | 2/1907 | Smith | |
| 1,903,481 A | 4/1933 | Schweisthal | |
| 2,138,218 A * | 11/1938 | Raigorodsky | ............ C10G 5/06 |
| | | | 196/132 |
| 2,225,959 A | 12/1940 | Miller | |
| 2,726,729 A | 12/1955 | Williams | |
| 2,738,026 A | 3/1956 | Glasgow et al. | |
| 2,765,872 A | 10/1956 | Hartman et al. | |
| 2,786,543 A | 3/1957 | Hayes et al. | |
| 2,812,827 A | 11/1957 | Worley et al. | |
| 2,815,901 A | 12/1957 | Hale | |
| 2,853,149 A | 9/1958 | Gosselin | |
| 2,937,140 A | 5/1960 | Stinson | |
| 2,970,107 A | 1/1961 | Gilmore | |

(Continued)

FOREIGN PATENT DOCUMENTS

| | | |
|---|---|---|
| AR | 011862 | 9/2000 |
| AR | 024366 | 10/2002 |

(Continued)

OTHER PUBLICATIONS

"Natural Gas Dehydration", The Environmental Technology Verification Program, Sep. 2003.

(Continued)

*Primary Examiner* — Robert A Hopkins
(74) *Attorney, Agent, or Firm* — Peacock Law P.C.; Justin Jackson; Deborah Peacock

(57) ABSTRACT

A method, apparatus and system for cooling compressed gases at a well site without the need for fans. Wherein produced liquids act as a continuously-flowing heat sink for gases entering stages of compression. Heat sinks can be automatically bypassed such that gases are compressed without first cooling them based upon outputs of temperature sensors.

19 Claims, 3 Drawing Sheets

(56) References Cited

U.S. PATENT DOCUMENTS

| | | |
|---|---|---|
| 2,984,360 A | 5/1961 | Smith |
| 3,018,640 A | 1/1962 | Heller et al. |
| 3,025,928 A | 3/1962 | Heath |
| 3,027,651 A | 4/1962 | Nerge |
| 3,094,574 A | 6/1963 | Glasgow et al. |
| 3,105,855 A | 10/1963 | Meyers |
| 3,119,674 A | 1/1964 | Glasgow et al. |
| 3,152,753 A | 10/1964 | Adams |
| 3,182,434 A | 5/1965 | Fryar |
| 3,232,027 A | 2/1966 | Lorenz et al. |
| 3,237,847 A | 3/1966 | Wilson |
| 3,254,473 A | 6/1966 | Fryar et al. |
| 3,255,573 A | 6/1966 | Cox, Jr. et al. |
| 3,288,448 A | 11/1966 | Patterson et al. |
| 3,321,890 A | 5/1967 | Barnhart |
| 3,347,019 A | 10/1967 | Barnhart |
| 3,360,127 A | 12/1967 | Wood, Jr. |
| 3,396,512 A | 8/1968 | McMinn et al. |
| 3,398,723 A | 8/1968 | Smalling |
| 3,407,052 A | 10/1968 | Huntress et al. |
| 3,528,758 A | 9/1970 | Perkins |
| 3,540,821 A | 11/1970 | Siegmund |
| 3,541,763 A | 11/1970 | Heath et al. |
| 3,589,984 A | 6/1971 | Reid |
| 3,616,598 A | 11/1971 | Floral, Jr. |
| 3,648,434 A | 3/1972 | Graves, III et al. |
| 3,659,401 A | 5/1972 | Giammarco |
| 3,662,017 A | 5/1972 | Woerner et al. |
| 3,672,127 A | 6/1972 | Mayse et al. |
| 3,736,725 A | 6/1973 | Alleman et al. |
| 3,817,687 A | 6/1974 | Cavallero et al. |
| 3,829,521 A | 8/1974 | Green |
| 3,855,337 A | 12/1974 | Foral, Jr. et al. |
| 3,872,682 A | 3/1975 | Shook |
| 3,949,749 A | 4/1976 | Stewart |
| 3,989,487 A | 11/1976 | Peterson |
| 4,009,985 A | 3/1977 | Hirt |
| 4,010,009 A | 3/1977 | Moyer |
| 4,010,065 A | 3/1977 | Alleman |
| 4,058,147 A | 11/1977 | Stary et al. |
| 4,098,303 A | 7/1978 | Gammell |
| 4,108,618 A | 8/1978 | Schneider |
| 4,118,170 A | 10/1978 | Hirt |
| 4,134,271 A | 1/1979 | Datia |
| 4,139,596 A | 2/1979 | Vaseen |
| 4,162,145 A | 7/1979 | Alleman |
| 4,165,618 A | 8/1979 | Tyree, Jr. |
| 4,198,214 A | 4/1980 | Heath et al. |
| 4,270,938 A | 6/1981 | Schmidt et al. |
| 4,286,929 A | 9/1981 | Heath et al. |
| 4,305,895 A | 12/1981 | Heath et al. |
| 4,322,265 A | 3/1982 | Wood |
| 4,332,643 A | 6/1982 | Reid |
| 4,342,572 A | 8/1982 | Heath |
| 4,362,462 A | 12/1982 | Blotenberg |
| 4,369,049 A | 1/1983 | Heath |
| 4,396,371 A | 8/1983 | Lorenz et al. |
| 4,402,652 A | 9/1983 | Gerlach et al. |
| 4,421,062 A | 12/1983 | Padilla, Sr. |
| 4,431,433 A | 2/1984 | Gerlach et al. |
| 4,435,196 A | 3/1984 | Pielkenrood |
| 4,459,098 A | 7/1984 | Turek et al. |
| 4,462,813 A | 7/1984 | May et al. |
| 4,474,549 A | 10/1984 | Capone |
| 4,474,550 A | 10/1984 | Heath et al. |
| 4,493,770 A | 1/1985 | Moilliet |
| 4,501,253 A | 2/1985 | Gertsmann et al. |
| 4,505,333 A | 3/1985 | Ricks |
| 4,511,374 A | 4/1985 | Heath |
| 4,539,023 A | 9/1985 | Boley |
| 4,568,268 A | 2/1986 | Gerlach et al. |
| 4,579,565 A | 4/1986 | Heath |
| 4,583,998 A | 4/1986 | Reid et al. |
| 4,588,372 A | 5/1986 | Torborg |
| 4,588,424 A | 5/1986 | Heath et al. |
| 4,597,733 A | 7/1986 | Dean |
| 4,615,673 A | 10/1986 | Heath et al. |
| 4,617,030 A | 10/1986 | Heath |
| 4,659,344 A | 4/1987 | Gerlach et al. |
| 4,674,446 A | 6/1987 | Padilla, Sr. |
| 4,676,806 A | 6/1987 | Dean et al. |
| 4,689,053 A | 8/1987 | Heath |
| 4,701,188 A | 10/1987 | Mims |
| 4,715,808 A | 12/1987 | Heath et al. |
| 4,737,168 A | 4/1988 | Heath |
| 4,778,443 A | 10/1988 | Sands et al. |
| 4,780,115 A | 10/1988 | Ranke |
| 4,824,447 A | 4/1989 | Goldsberry |
| 4,830,580 A | 5/1989 | Hata et al. |
| 4,919,777 A | 4/1990 | Bull |
| 4,948,393 A | 8/1990 | Hodson et al. |
| 4,949,544 A | 8/1990 | Hines |
| 4,978,291 A | 12/1990 | Nakai |
| 4,983,364 A | 1/1991 | Buck et al. |
| 5,016,447 A | 5/1991 | Lane et al. |
| 5,080,802 A | 1/1992 | Cairo, Jr. et al. |
| 5,084,074 A | 1/1992 | Beer et al. |
| 5,129,925 A | 7/1992 | Marsala et al. |
| 5,130,078 A | 7/1992 | Dillman |
| 5,132,011 A | 7/1992 | Ferris |
| 5,163,981 A | 11/1992 | Choi |
| 5,167,675 A | 12/1992 | Rhodes |
| 5,191,990 A | 3/1993 | Fritts |
| 5,195,587 A | 3/1993 | Webb |
| 5,209,762 A | 5/1993 | Lowell |
| 5,249,739 A | 10/1993 | Bartels et al. |
| 5,269,886 A | 12/1993 | Brigham |
| 5,346,537 A | 9/1994 | Lowell |
| 5,377,723 A | 1/1995 | Hilliard |
| 5,419,299 A | 5/1995 | Fukasawa et al. |
| 5,453,114 A | 9/1995 | Ebeling |
| 5,476,126 A | 12/1995 | Hilliard et al. |
| 5,490,873 A | 2/1996 | Behrens et al. |
| 5,501,253 A | 3/1996 | Weiss |
| 5,513,680 A | 5/1996 | Hilliard et al. |
| 5,536,303 A | 7/1996 | Ebeling |
| 5,571,310 A | 11/1996 | Nanaji |
| 5,579,740 A | 12/1996 | Cotton et al. |
| 5,626,027 A | 5/1997 | Dormer et al. |
| 5,664,144 A | 9/1997 | Yanai et al. |
| 5,665,144 A | 9/1997 | Hill et al. |
| 5,678,411 A | 10/1997 | Matsumura et al. |
| 5,755,854 A | 5/1998 | Nanaji |
| 5,766,313 A | 6/1998 | Heath |
| 5,826,433 A | 10/1998 | Dube |
| 5,857,616 A | 1/1999 | Karnoff et al. |
| 5,878,725 A | 3/1999 | Osterbrink |
| 5,882,486 A | 3/1999 | Moore |
| 5,885,060 A | 3/1999 | Cunkelman et al. |
| 5,988,232 A | 11/1999 | Koch et al. |
| 6,004,380 A | 12/1999 | Landreau et al. |
| 6,010,674 A | 1/2000 | Miles et al. |
| 6,023,003 A | 2/2000 | Dunning et al. |
| 6,027,311 A | 2/2000 | Hill et al. |
| 6,095,793 A | 8/2000 | Greeb |
| 6,142,191 A | 11/2000 | Sutton et al. |
| 6,183,540 B1 | 2/2001 | Thonsgaard |
| 6,193,500 B1 | 2/2001 | Bradt et al. |
| 6,223,789 B1 | 5/2001 | Koch |
| 6,224,369 B1 | 5/2001 | Moneyhun |
| 6,238,461 B1 | 5/2001 | Heath |
| 6,251,166 B1 | 6/2001 | Anderson |
| 6,273,937 B1 | 8/2001 | Schucker |
| 6,299,671 B1 | 10/2001 | Christensen |
| 6,314,981 B1 | 11/2001 | Mayzou et al. |
| 6,332,408 B2 | 12/2001 | Howlett |
| 6,363,744 B2 | 4/2002 | Finn et al. |
| 6,364,933 B1 | 4/2002 | Heath |
| 6,425,942 B1 | 7/2002 | Forster |
| 6,461,413 B1 | 10/2002 | Landreau et al. |
| 6,478,576 B1 | 11/2002 | Bradt et al. |
| 6,499,476 B1 | 12/2002 | Reddy |
| 6,532,999 B2 | 3/2003 | Pope et al. |
| 6,533,574 B1 | 3/2003 | Pechoux |

(56) References Cited

U.S. PATENT DOCUMENTS

| | | |
|---|---|---|
| 6,537,349 B2 | 3/2003 | Choi et al. |
| 6,537,458 B1 | 3/2003 | Polderman |
| 6,551,379 B2 | 4/2003 | Heath |
| 6,604,558 B2 | 8/2003 | Sauer |
| 6,616,731 B1 | 9/2003 | Hillstrom |
| 6,719,824 B1 | 4/2004 | Bowser |
| 6,745,576 B1 | 6/2004 | Granger |
| 6,931,919 B2 | 8/2005 | Weldon |
| 6,984,257 B2 | 1/2006 | Heath et al. |
| 7,005,057 B1 | 2/2006 | Kalnes |
| 7,025,084 B2 | 4/2006 | Perry et al. |
| 7,131,265 B2 | 11/2006 | Lechner |
| RE39,944 E | 12/2007 | Heath |
| 7,350,581 B2 | 4/2008 | Wynn |
| 7,481,237 B2 | 1/2009 | Jones et al. |
| 7,497,180 B2 | 3/2009 | Karlsson et al. |
| 7,531,030 B2 | 5/2009 | Heath et al. |
| 7,575,672 B1 | 8/2009 | Gilmore |
| 7,791,882 B2 | 9/2010 | Chu et al. |
| 7,905,722 B1 | 3/2011 | Heath et al. |
| 8,529,215 B2 | 9/2013 | Heath et al. |
| 8,840,703 B1 | 9/2014 | Heath et al. |
| 8,864,887 B2 | 10/2014 | Heath et al. |
| 8,900,343 B1 | 12/2014 | Heath et al. |
| 2001/0008073 A1 | 7/2001 | Finn et al. |
| 2002/0073843 A1 | 6/2002 | Heath |
| 2002/0081213 A1 | 6/2002 | Takahashi et al. |
| 2002/0178918 A1 | 12/2002 | Lecomte et al. |
| 2002/0185006 A1 | 12/2002 | Lecomte et al. |
| 2003/0005823 A1 | 1/2003 | Le Blanc et al. |
| 2003/0167690 A1 | 9/2003 | Edlund et al. |
| 2004/0031389 A1 | 2/2004 | Heath et al. |
| 2004/0186630 A1 | 9/2004 | Shier et al. |
| 2004/0211192 A1 | 10/2004 | Lechner |
| 2005/0115248 A1 | 6/2005 | Koehler et al. |
| 2005/0266362 A1 | 12/2005 | Stone et al. |
| 2006/0144080 A1 | 7/2006 | Heath et al. |
| 2006/0156744 A1 | 7/2006 | Cusiter et al. |
| 2006/0156758 A1 | 7/2006 | An et al. |
| 2006/0218900 A1 | 10/2006 | Lechner |
| 2006/0254777 A1 | 11/2006 | Wynn |
| 2006/0260468 A1 | 11/2006 | Amin |
| 2007/0051114 A1 | 3/2007 | Mahlanen |
| 2007/0084341 A1 | 4/2007 | Heath et al. |
| 2007/0151292 A1 | 7/2007 | Heath et al. |
| 2007/0175226 A1 | 8/2007 | Karlsson et al. |
| 2007/0186770 A1 | 8/2007 | Heath et al. |
| 2007/0199696 A1 | 8/2007 | Walford |
| 2008/0008602 A1 | 1/2008 | Pozivil et al. |
| 2008/0120993 A1 | 5/2008 | An et al. |
| 2009/0133578 A1 | 5/2009 | Brasa et al. |
| 2009/0223246 A1 | 9/2009 | Heath et al. |
| 2010/0040989 A1 | 2/2010 | Heath et al. |
| 2010/0083678 A1 | 4/2010 | Lifson et al. |
| 2010/0083691 A1 | 4/2010 | Immink et al. |
| 2010/0263393 A1 | 10/2010 | Chen et al. |
| 2010/0313586 A1 | 12/2010 | Yakumaru et al. |
| 2012/0079851 A1 | 4/2012 | Heath et al. |
| 2012/0261092 A1 | 10/2012 | Heath et al. |
| 2013/0319844 A1 | 12/2013 | Heath et al. |

FOREIGN PATENT DOCUMENTS

| | | |
|---|---|---|
| CA | 2281610 | 9/1998 |
| CA | 2426071 | 10/2003 |
| CA | 2224389 | 2/2008 |
| CA | 2311440 | 6/2011 |
| CA | 2563747 | 5/2013 |
| CA | 2523110 | 8/2014 |
| CA | 2541606 | 10/2014 |
| CA | 2809118 | 2/2015 |
| CA | 2573514 | 9/2015 |
| FR | 2542039 | 9/1984 |
| GB | 370591 | 4/1932 |
| GB | 573819 | 12/1945 |
| JP | 58185990 | 10/1983 |
| RU | 2159913 | 11/2000 |
| SU | 1021809 | 6/1983 |
| SU | 1801092 | 3/1993 |
| WO | 2005/068847 | 7/2005 |
| WO | 2010/080040 | 7/2010 |
| WO | 2013/170190 | 11/2013 |

OTHER PUBLICATIONS

Archer, "TEG Regenerator Vapor Recovery in Amoco's Northwesem Business Unit", Aug. 1992.

Kachanov, "On the Concept of Damage in Creep and in the Brittle-Elastic Range", International Journal of Damage Mechanics, vol. 3, 1994, 329-337.

Kushch, et al., "Effect of Crack Orientation Statistics on Effective Stiffness of Microcracked Solid", International Journal of Solids and Structures, vol. 46, 2009, 1574-1588.

Kushch, et al., "SIF Statistics in Micro Cracked Solid: Effect of Crack Density, Orientation and Clustering", International Journal of Engineering Science, vol. 47, 2009, 192-208.

Reid, "Coldfinger an Exhauster for Removing Trace Quantities of Water from Glycol Solutions Used for Gas Dehydration", Ball-Reid Engineers, Inc., Oklahoma City, Oklahoma, 1975, 592-602.

Sevostianov, et al., "Connections Between Elastic and Conductive Properties of Heterogeneous Materials", Advances in Applied Mechanics, vol. 42, 2008, 69-253.

Sevostianov, "Incremental Elastic Compliance and Electric Resistance of a Cylinder with Partial Loss in the Cross-Sectional Area", International Journal of Engineering Science, vol. 48, 2010, 582-591.

Sevostianov, "Local Minima and Gradients of Stiffness and Conductivity as Indicators of Strength Reduction of Brittle-Elastic Materials", Int J Fract, vol. 164, 2010, 147-154.

Sevostianov, "Thermal Conductivity of a Material Containing Cracks of Arbitrary Shape", International Journal of Engineering Science, vol. 44, 2006, 513-528.

\* cited by examiner

PRODUCED LIQUIDS COMPRESSOR COOLER

CROSS-REFERENCE TO RELATED APPLICATIONS

This application claims priority to and the benefit of the filing of U.S. Provisional Patent Application Ser. No. 61/895,356, entitled "Produced Liquids Compressor Cooler", filed on Oct. 24, 2013, and the specification thereof is incorporated herein by reference.

BACKGROUND OF THE INVENTION

Field of the Invention (Technical Field)

Embodiments of the present invention relate to a system, method, and apparatus for cooling compressed gases at a well site without the use of fans.

Description of Related Art

Compressors at well sites require cooling between various stages of compression and after passing through the compressor so as to avoid excessive temperatures which can damage the compressor and any down-stream components. Such cooling is typically achieved via air-cooling with large fans. Because such fans are often quite large and must move a significant volume of air to achieve the desired effect, they produce a large amount of noise. Further, these mechanical fans are prone to failure and require ongoing maintenance to ensure that they are functioning properly. The excessive noise generated by such large fans often inhibits their use near homes and businesses.

In addition, because fans rely on ambient air temperature, which is non-controllable, their use, particularly during periods of cold weather, can cause the formation of liquids from condensation within the compressed gases.

There is thus a present need for a method, system, and apparatus which cool compressed gases at a well site while avoiding the many draw-backs of air-cooling.

Objects, advantages novel features, and further scope of applicability of the present invention will be set forth in part in the detailed description to follow, taken in conjunction with the accompanying drawings, and in part will become apparent to those skilled in the art upon examination of the following, or may be learned by practice of the invention.

BRIEF SUMMARY OF EMBODIMENTS OF THE PRESENT INVENTION

An embodiment of the present invention relates to a cooling apparatus having at least one heat exchanger disposed within a cooling vessel, the cooling vessel configured to receive a flow of liquid produced by a hydrocarbon-producing well such that heat is passed from the heat exchanger to the liquid, an outlet of a suction scrubber communicably coupled to an inlet of at least one stage of a compressor, a valve positioned to selectively cause at least a portion of a flow of compressed gas to bypass at least one of the heat exchangers, a temperature sensor positioned downstream of the valve; and the temperature sensor and the valve configured such that the valve is activated in response to an output of the temperature sensor.

In one embodiment, the heat exchanger has an inlet that is communicably coupled to an outlet of at least one stage of the compressor. The flow of liquid can be a flow of liquids that includes hydrocarbons and/or hydrocarbons and salt water. In addition, communicable couplings can be provided which connect to a condensation outlet of the suction scrubber such that liquid removed by the suction scrubber is passed to a vapor recovery system.

At least one of the one or more heat exchangers is communicably coupled to an outlet of a first stage of the compressor and the valve is positioned to bypass the heat exchanger that is communicably coupled to the outlet of the first stage of the compressor and the temperature sensor is positioned to detect a temperature of the compressed gas before it enters a second stage of the compressor.

Optionally, at least one of the one or more heat exchangers can be communicably coupled to an outlet of a final stage of the compressor and the valve can be positioned to selectively cause at least a portion of the flow of gas to bypass the heat exchanger that is communicably coupled to the outlet of a final stage of the compressor. The cooling vessel can include a water outlet and the outlet can include a weir system, a float-activated valve, a continuously flowing drain arranged on a lower portion of the cooling vessel, combinations thereof, and the like.

Optionally, an inner chamber can be disposed in the cooling vessel, a final stage of heat exchangers can be disposed in the inner chamber, and an inlet of the cooling vessel can be positioned such that flow of liquid first passes the final stage before then exiting the inner chamber and passing to remaining heat exchangers. An outlet of a subsequent stage of the compressor can be communicably connected to the first stage of the compressor so as to ensure a constant positive pressure to an inlet of the first stage of the compressor.

An embodiment of the present invention also relates to a cooling method which includes directing a flow of liquid from a hydrocarbon-producing well through a cooling vessel in which at least one heat exchanger is disposed, directing gas exiting a first stage of a compressor through a first of the at least one heat exchangers such that heat from the gas is absorbed by the liquid, configuring a first valve to at least partially bypass the first heat exchanger in response to a first sensed temperature of the gas, the first sensed temperature comprising a temperature of the gas prior to it entering a second stage of the compressor, and directing gas from the first heat exchanger to a suction scrubber prior to directing the gas into the second stage of the compressor.

A second of the at least one heat exchangers disposed within the cooling vessel, the second heat exchanger having an inlet communicably coupled to an outlet of the second stage of the compressor, a second valve configured to at least partially bypass the second heat exchanger in response to a second sensed temperature of the gas, the second sensed temperature of the gas comprising a temperature of the gas downstream of the second valve. The method can also include directing condensation from an outlet of the suction scrubber to a vapor recovery system, and/or drawing water from a lower portion of the cooling vessel.

The method can also include directing the flow of liquid past a final one of the one or more heat exchangers and then past others of the one or more heat exchangers. The method can also optionally include connecting an outlet of a subsequent stage of the compressor to an inlet of the first stage of the compressor such that a constant positive pressure is maintained at the inlet of the first stage of the compressor.

An embodiment of the present invention also relates to a cooling system that includes a cooling apparatus having at least one heat exchanger disposed within a cooling vessel, the cooling vessel configured to receive a flow of liquid that is produced by a hydrocarbon-producing well such that heat is passed from the at least one heat exchanger to the liquid, an outlet of a suction scrubber communicably coupled to an inlet of at least one stage of a compressor, a valve positioned to selectively cause at least a portion of a compressed gas to bypass at least one of the heat exchangers, a temperature sensor positioned downstream of the valve; and the temperature sensor and the valve configured such that the valve is activated in response to an output of the temperature sensor. The system further includes the steps of directing a flow of liquid from the hydrocarbon-producing well through the cooling vessel in which the at least one heat exchanger is disposed, directing gas exiting a first stage of a compressor through a first of the one or more heat exchangers such that heat from the gas is absorbed by the liquid, configuring a first valve to at least partially bypass the first of the at least one heat exchangers in response to a first sensed temperature of the gas, the first sensed temperature comprising a temperature of the gas prior to entering a second stage of the compressor, and directing the gas through a suction scrubber before passing it to at least one of the stages of the compressor.

Objects, advantages and novel features, and further scope of applicability of the present invention will be set forth in part in the detailed description to follow, taken in conjunction with the accompanying drawings, and in part will become apparent to those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF THE SEVERAL VIEWS OF THE DRAWINGS

The accompanying drawings, which are incorporated into and form a part of the specification, illustrate an embodiment of the present invention and, together with the description, serve to explain the principles of the invention. The drawings are only for the purpose of illustrating one or more preferred embodiments of the invention and are not to be construed as limiting the invention. In the drawings.

DETAILED DESCRIPTION OF THE INVENTION

Embodiments of the present invention are directed to a method, system, and apparatus for cooling a compressed gas at a well site without relying on air cooling.

Figure 1:
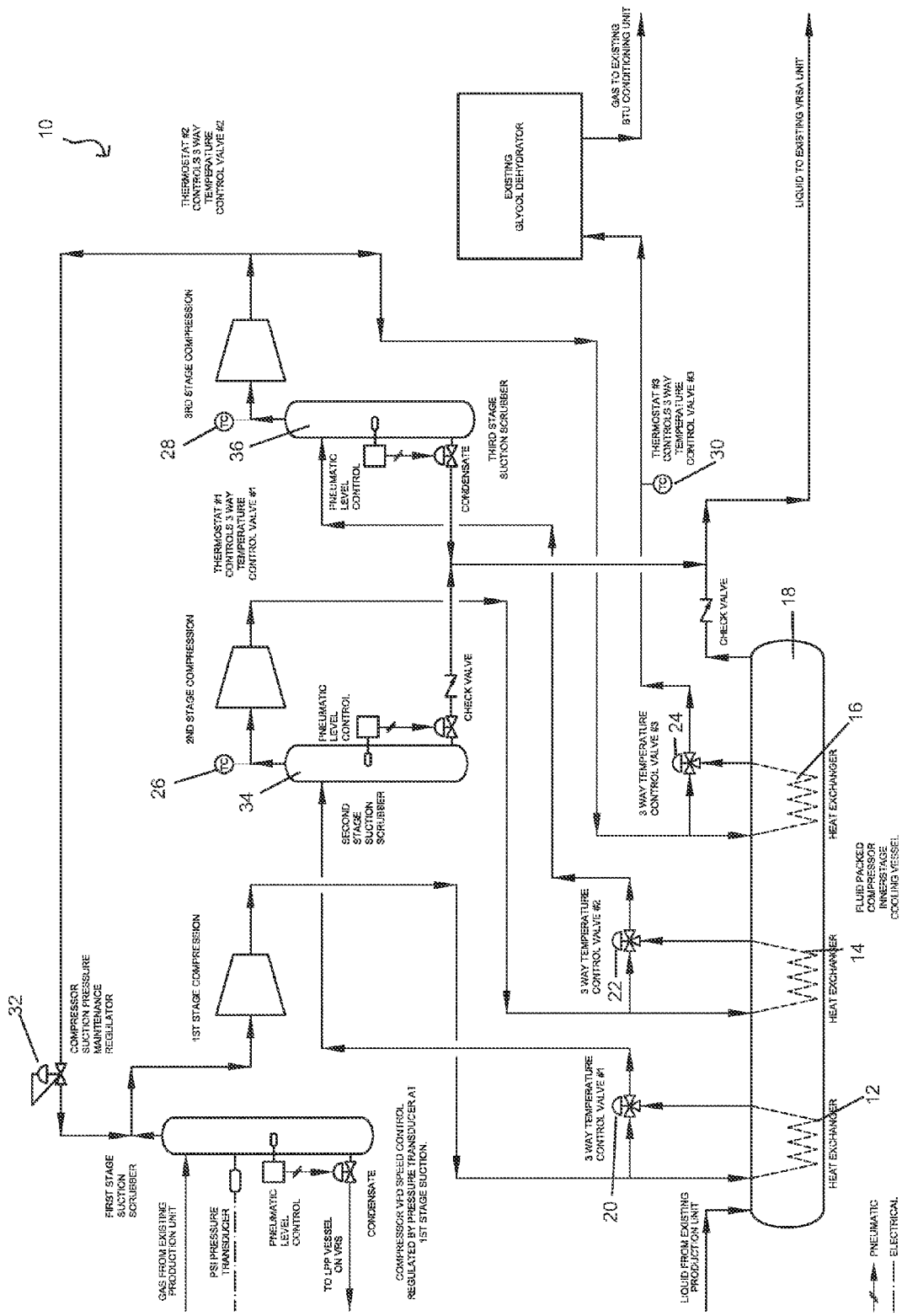
FIG. 1 is a flow diagram illustrating an embodiment of the present invention.

Referring now to the drawings, FIG. 1 is a flow diagram which illustrates a produced liquids compressor cooler connected to a three-stage compressor according to an embodiment of the present invention. In the drawing, for convenience, reference number 10 is used to identify the cooler. However, it is to be understood that one or more of the components contained in the drawing (including but not limited to the first stage suction scrubber and the 3-stage compressor) can already be provided and thus need not be provided in order to achieve a cooling effect. Further, a two-stage compressor configuration can also be provided by removing the second stage of compression in the drawing and the accompanying heat exchanger.

In one embodiment, cooler 10 preferably comprises first heat exchanger 12, second heat exchanger 14, and third heat exchanger 16 disposed in cooling vessel 18. Vessel 18 is preferably connected to receive liquid from a production unit and pass liquid to down-stream equipment, such as an existing vapor recovery unit. Thus, in operation, vessel 18 is filled with produced liquids, which act as a heat sink for compressed gases which travel through the heat exchangers. The liquids which are thus heated from their interaction with the heat exchangers then continue flowing on to down-stream equipment. The fluid within vessel 18 is thus continuously being replaced with a fresh supply of liquids to act as a continuous heat sink.

In one embodiment, each of heat exchangers 12, 14, and 16 are connected to a respective control valve 20, 22, and 24. In this embodiment, control valves are the only moving components. In this embodiment, control valves 20, 22, and 24 are preferably 3-way temperature control valves which permit the respective heat exchanger to be at least partially bypassed if the temperature at the location of a corresponding temperature sensor is below a predetermined amount. Thus, the control valves and temperature sensors work to maintain an at least substantially constant temperature at a predetermined set point. In this embodiment, temperature sensor 26, which is used in controlling control valve 20 is preferably disposed just prior to or at an inlet of the second stage of the compressor. Temperature sensor 28, which is used in controlling control valve 22 is preferably disposed prior to or at the inlet of a third stage of compression. Temperature sensor 30, which is used in controlling control valve 24 is preferably disposed downstream of control valve 24.

In one embodiment, pressure regulator 32 is preferably provided between an outlet of third stage of compression and an inlet of the first stage of compression to ensure a minimum constant pressure to the inlet of the first stage of compression.

In one embodiment, second stage suction scrubber 34 is preferably connected to an inlet of the second stage of the compressor. In addition, third stage suction scrubber 36 is preferably connected to an inlet of the third stage of the compressor. In this embodiment, compressed gases from the first stage of the compressor enter into second stage suction scrubber 34 without passing through heat exchanger 12 if the temperature of gases passing temperature sensor 26 are less than a predetermined amount. If, however, the temperature of gases passing temperature sensor 26 are at or above a predetermined amount, then gases which exit the first stage of the compressor pass through heat exchanger 12 before entering second stage suction scrubber 34 before then entering the second stage of the compressor. Likewise, compressed gases from the second stage of the compressor enter into third stage suction scrubber 36 without passing through heat exchanger 14 if the temperature of gases passing temperature sensor 28 are less than a predetermined amount. If, however, the temperature of gases passing temperature sensor 28 are at or above a predetermined amount, then gases which exit the second stage of the compressor pass through heat exchanger 14 before entering third stage suction scrubber 36 before then entering the third stage of the compressor. Optionally, temperature sensors 26 and 28 can be disposed before or after each of respective suction scrubbers 34 and 36. In one embodiment, the outlet of every stage of the compressor comprises a heat exchanger connected to it. Optionally, however, all except the final stage of the compressor comprises a heat exchanger connected to it. Thus for embodiments wherein a two stage compressor is used, there can be used one or two heat exchangers. For embodiments wherein a three stage compressor is used, there can be used two or three heat exchangers. For embodiments having more than three stages of compression, the number of heat exchangers used can be equal to the number of stages of compression or the number of heat exchangers used can be one less than the number of stages of compression.

Figure 2:
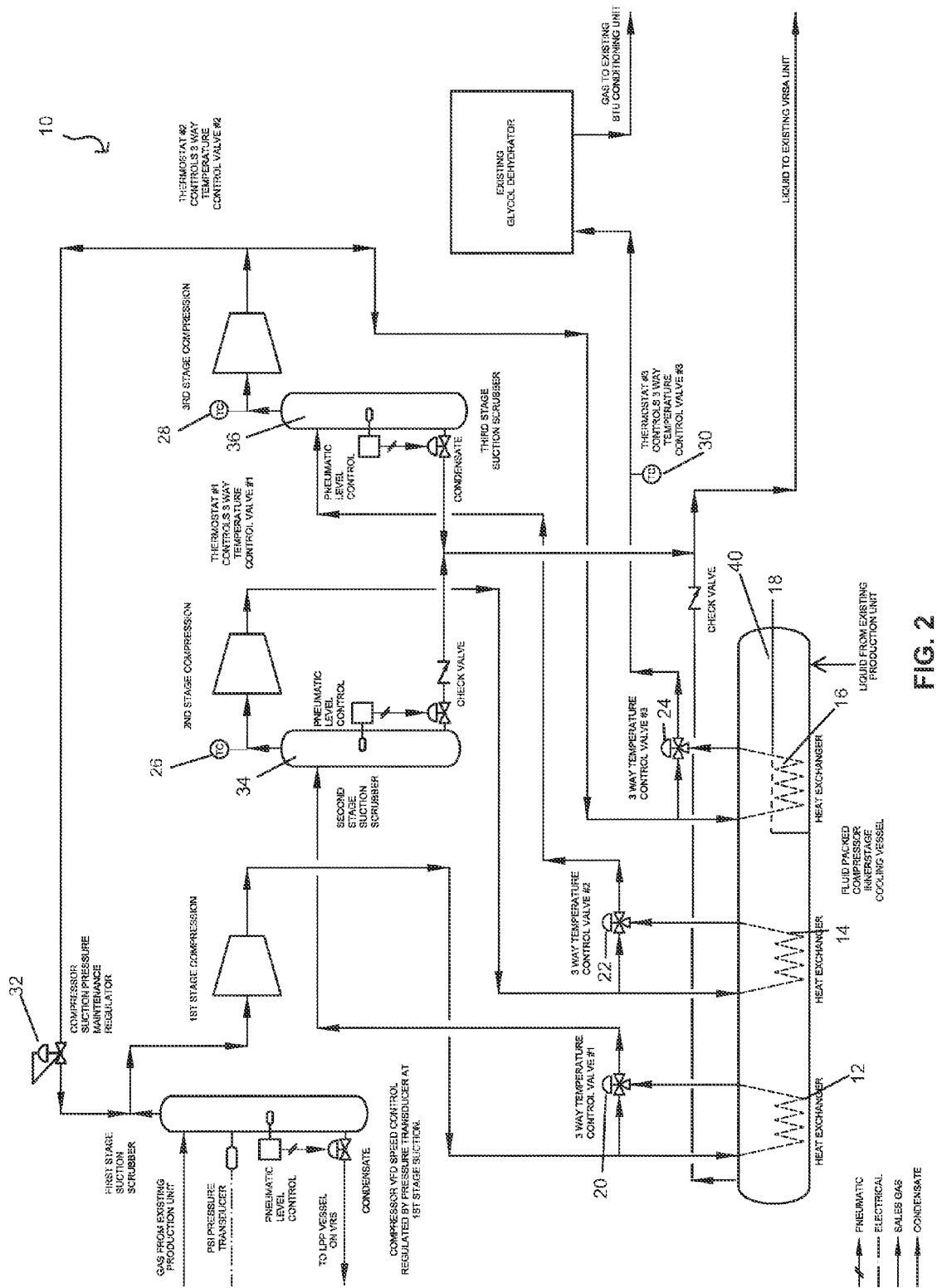
FIG. 2 is a flow diagram illustrating an embodiment of the present invention wherein incoming liquids first pass a final heat exchanger.

As best illustrated in FIG. 2, in one embodiment, cooling vessel 18 can comprise inner chamber formed by divider 40. Although numerous configurations of divider 40 can be used and will provide desirable results, divider 40 is preferably configured such that incoming liquids are first caused to pass a final heat exchanger, before exiting the inner chamber formed by divider 40 and thus coming into contact with the other heat exchangers. This configuration thus permits the coolest liquids which enter cooling vessel 18 to first interact with the final heat exchanger before being further heated by the remaining heating coils, thus resulting in the greatest cooling effect being provided to the final heat exchanger.

Figure 3:
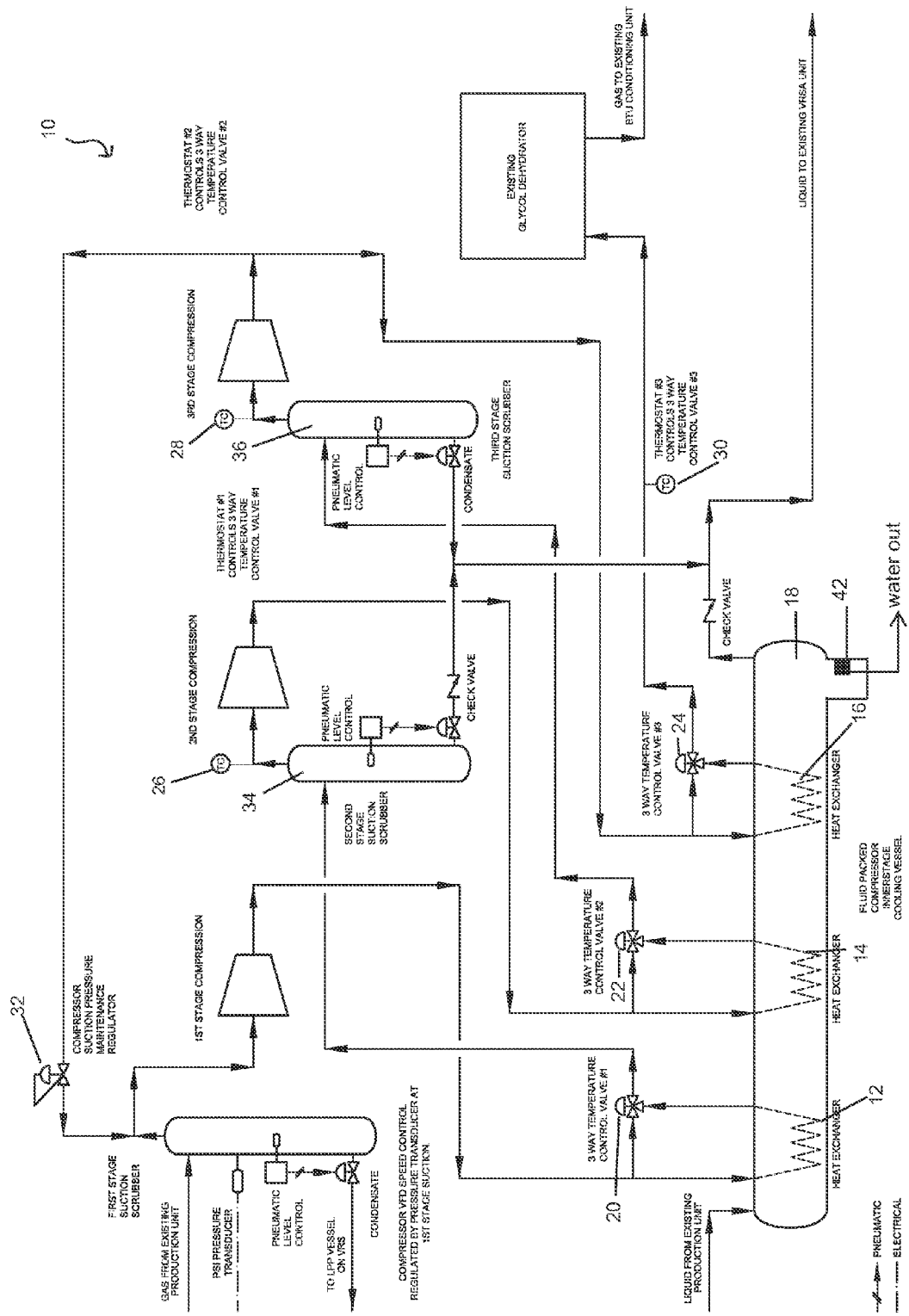
FIG. 3 is a flow diagram illustrating an embodiment of the present invention wherein the cooling vessel comprises a water outlet.

As best illustrated in FIG. 3, in one embodiment, cooling vessel 18 preferably comprises a water outlet. Although numerous apparatuses, methods, and systems can be used to remove water from below oil in cooling vessel 18, including but not limited to a weir system, a float valve is preferably provided which dumps water from vessel 18. In an alternative embodiment, a quantity of liquid can be continuously removed from the bottom of cooling vessel 18 to ensure that the vessel does not gradually become filled with saltwater.

Embodiments of the present invention preferably keep the discharge temperature of the compressed gases above the dew point of the gases at the compressed pressure. If the temperature of the compressed gases is below the dew point of the gases, liquid hydrocarbons that are in a vapor state at the suction pressure of a compressor stage will begin to condense. Condensation of liquid hydrocarbons in the compressed gas can potentially damage the compressor as well as creating high vapor liquids which will flash when dumped by the scrubbers to a lower pressure. If a vapor recovery system is being used, downstream of the present invention, the flash vapors will again be recovered by the vapor recovery system, thus creating recycle loops that can overload the vapor recovery system.

Although the invention has been described in detail with particular reference to these preferred embodiments, other embodiments can achieve the same results. Variations and modifications of the present invention will be obvious to those skilled in the art and it is intended to cover all such modifications and equivalents. The entire disclosures of all references, applications, patents, and publications cited above and/or in the attachments, and of the corresponding application(s), are hereby incorporated by reference.

What is claimed is:

1. A cooling apparatus comprising:
   at least one heat exchanger disposed within a cooling vessel;
   said cooling vessel configured to receive a flow of liquid produced by a hydrocarbon-producing well such that heat is passed from said heat exchanger to the liquid;
   an outlet of a suction scrubber communicably coupled to an inlet of at least one stage of a compressor;
   a valve positioned to selectively cause at least a portion of a flow of compressed gas to bypass at least one of said heat exchangers;
   a temperature sensor positioned downstream of said valve; and
   said temperature sensor and said valve configured such that said valve is activated in response to an output of said temperature sensor.

2. The cooling apparatus of claim 1 wherein said heat exchanger comprises an inlet communicably coupled to an outlet of at least one stage of the compressor.

3. The cooling apparatus of claim 1 wherein the flow of liquid comprises a flow of liquids comprising hydrocarbons.

4. The cooling apparatus of claim 1 further comprising communicable couplings connecting to a condensation outlet of said suction scrubber such that liquid removed by said suction scrubber is passed to a vapor recovery system.

5. The cooling apparatus of claim 1 wherein at least one of said one or more heat exchangers is communicably coupled to an outlet of a first stage of the compressor and wherein said valve is positioned to bypass said heat exchanger that is communicably coupled to the outlet of the first stage of the compressor and wherein said temperature sensor is positioned to detect a temperature of the compressed gas before it enters a second stage of the compressor.

6. The cooling apparatus of claim 1 wherein at least one of said one or more heat exchangers is communicably coupled to an outlet of a final stage of the compressor and wherein said valve is positioned to selectively cause at least a portion of the flow of gas to bypass said heat exchanger that is communicably coupled to the outlet of a final stage of the compressor.

7. The cooling apparatus of claim 1 wherein said cooling vessel comprises a water outlet.

8. The cooling apparatus of claim 7 wherein said water outlet comprises a weir system.

9. The cooling apparatus of claim 7 wherein said water outlet comprises a float-activated valve.

10. The cooling apparatus of claim 7 wherein said water outlet comprises a continuously flowing drain arranged on a lower portion of said cooling vessel.

11. The cooling apparatus of claim 1 wherein an inner chamber is disposed in said cooling vessel and wherein a final stage of said one or more heat exchangers is disposed in said inner chamber and wherein an inlet of the cooling vessel is positioned such that the flow of liquid first passes said final stage before then exiting said inner chamber and passing to remaining heat exchangers of said one or more heat exchangers.

12. The cooling apparatus of claim 1 wherein an outlet of a subsequent stage of the compressor is communicably connected to a first stage of the compressor so as to ensure a constant positive pressure to an inlet of the first stage of the compressor.

13. A cooling method comprising:
   directing a flow of liquid from a hydrocarbon-producing well through a cooling vessel in which at least one heat exchanger is disposed;
   directing gas exiting a first stage of a compressor through a first of the at least one heat exchangers such that heat from the gas is absorbed by the liquid;
   configuring a first valve to at least partially bypass the first heat exchanger in response to a first sensed temperature of the gas, the first sensed temperature comprising a temperature of the gas prior to it entering a second stage of the compressor; and directing gas from the first heat exchanger to a suction scrubber prior to directing the gas into the second stage of the compressor.

14. The cooling method of claim 13 further comprising a second of the at least one heat exchangers disposed within the cooling vessel, the second heat exchanger comprising an inlet communicably coupled to an outlet of the second stage of the compressor, a second valve configured to at least partially bypass the second heat exchanger in response to a second sensed temperature of the gas, the second sensed temperature of the gas comprising a temperature of the gas downstream of the second valve.

15. The cooling method of claim 13 further comprising directing condensation from an outlet of the suction scrubber to a vapor recovery system.

16. The cooling method of claim 13 further comprising drawing water from a lower portion of the cooling vessel.

17. The cooling method of claim 16 wherein drawing water from a lower portion of the cooling vessel comprises removing water with a float-activated valve.

18. The cooling method of claim 13 wherein directing a flow of liquids from a hydrocarbon-producing well through a cooling vessel comprises directing the flow of liquid past a final one of the one or more heat exchangers and then past others of the one or more heat exchangers.

19. The cooling method of claim 13 further comprising connecting an outlet of a subsequent stage of the compressor to an inlet of the first stage of the compressor such that a constant positive pressure is maintained at the inlet of the first stage of the compressor.

* * * * *